Dec. 28, 1948.  H. C. McCASLIN  2,457,583
VEHICLE TORSION BAR INDIVIDUAL WHEEL SUSPENSION
Filed Oct. 24, 1946  4 Sheets-Sheet 1
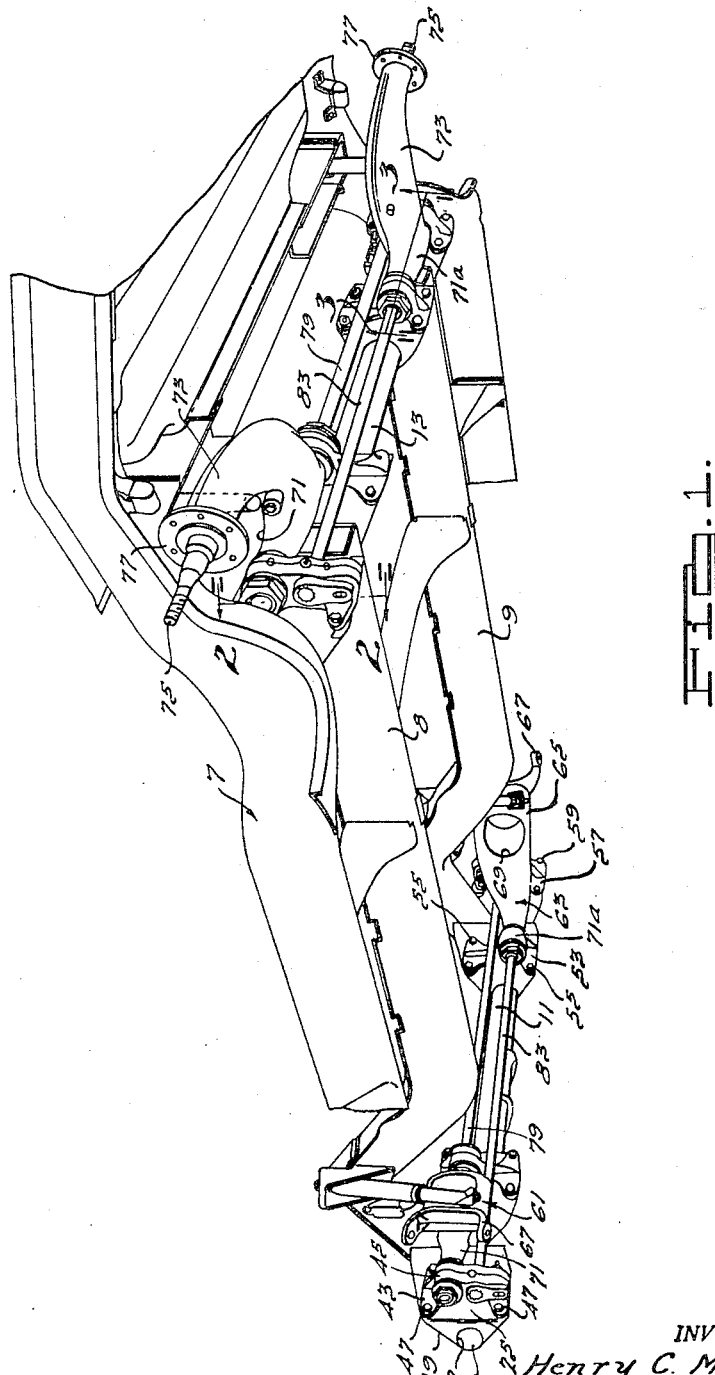
INVENTOR.
Henry C. Mc Caslin
BY
Barnes, Dickey & Pierce
ATTORNEYS Dec. 28, 1948.   H. C. McCASLIN   2,457,583
VEHICLE TORSION BAR INDIVIDUAL WHEEL SUSPENSION
Filed Oct. 24, 1946   4 Sheets-Sheet 2
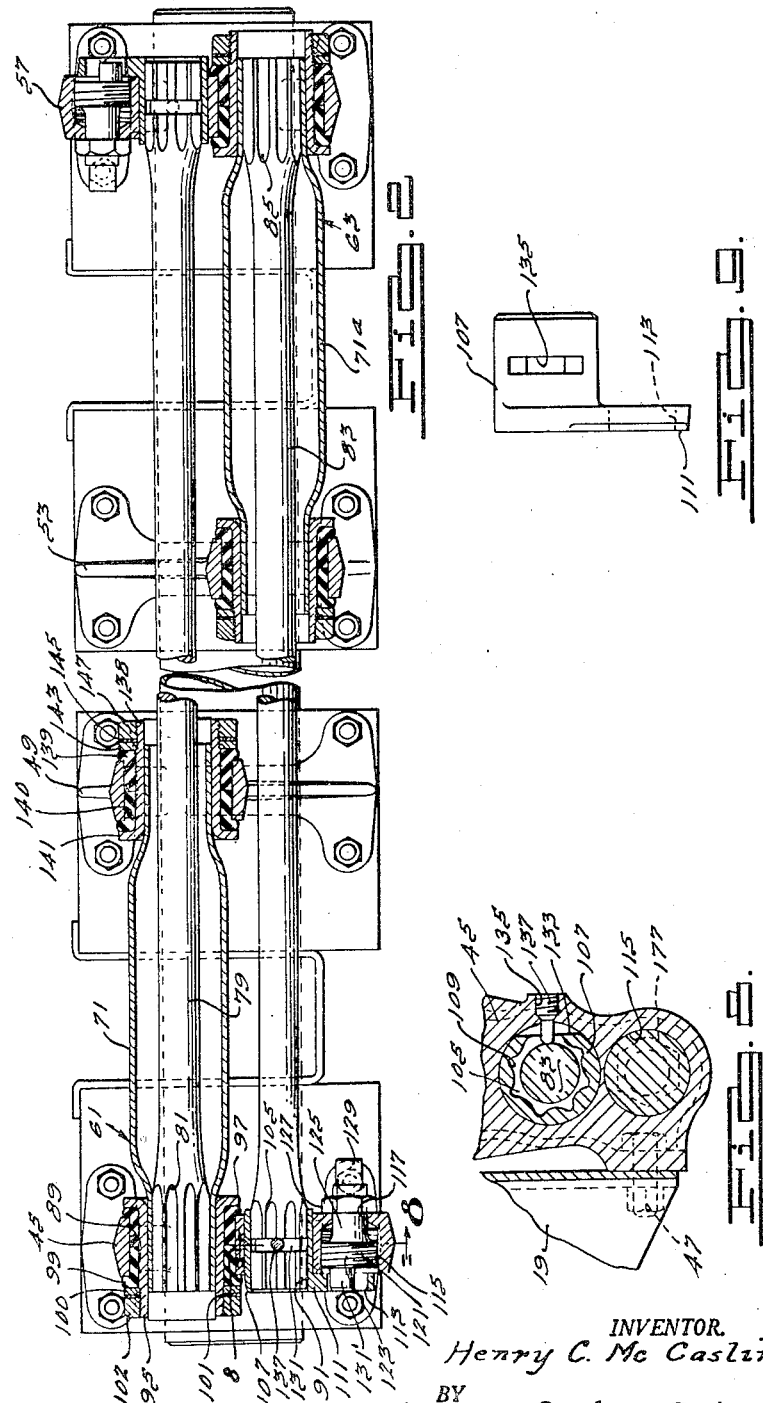
INVENTOR.
Henry C. McCaslin.
BY
Harness, Dickey & Pierce.
ATTORNEYS Dec. 28, 1948.    H. C. McCASLIN    2,457,583
VEHICLE TORSION BAR INDIVIDUAL WHEEL SUSPENSION
Filed Oct. 24, 1946    4 Sheets-Sheet 3
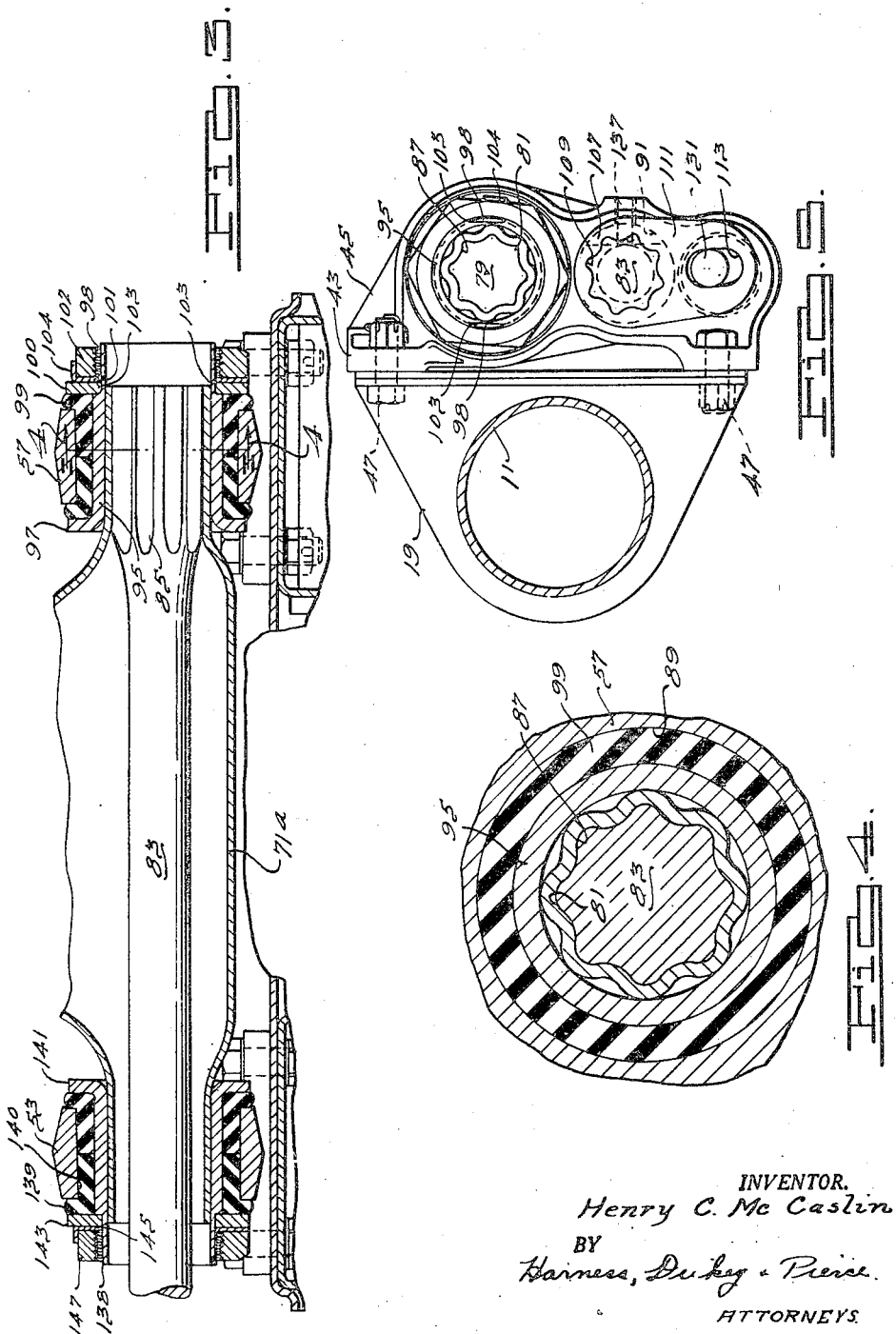
INVENTOR.
Henry C. Mc Caslin.
BY
Harness, Dickey & Pierce.
ATTORNEYS.

Dec. 28, 1948.  H. C. McCASLIN  2,457,583
VEHICLE TORSION BAR INDIVIDUAL WHEEL SUSPENSION
Filed Oct. 24, 1946  4 Sheets-Sheet 4
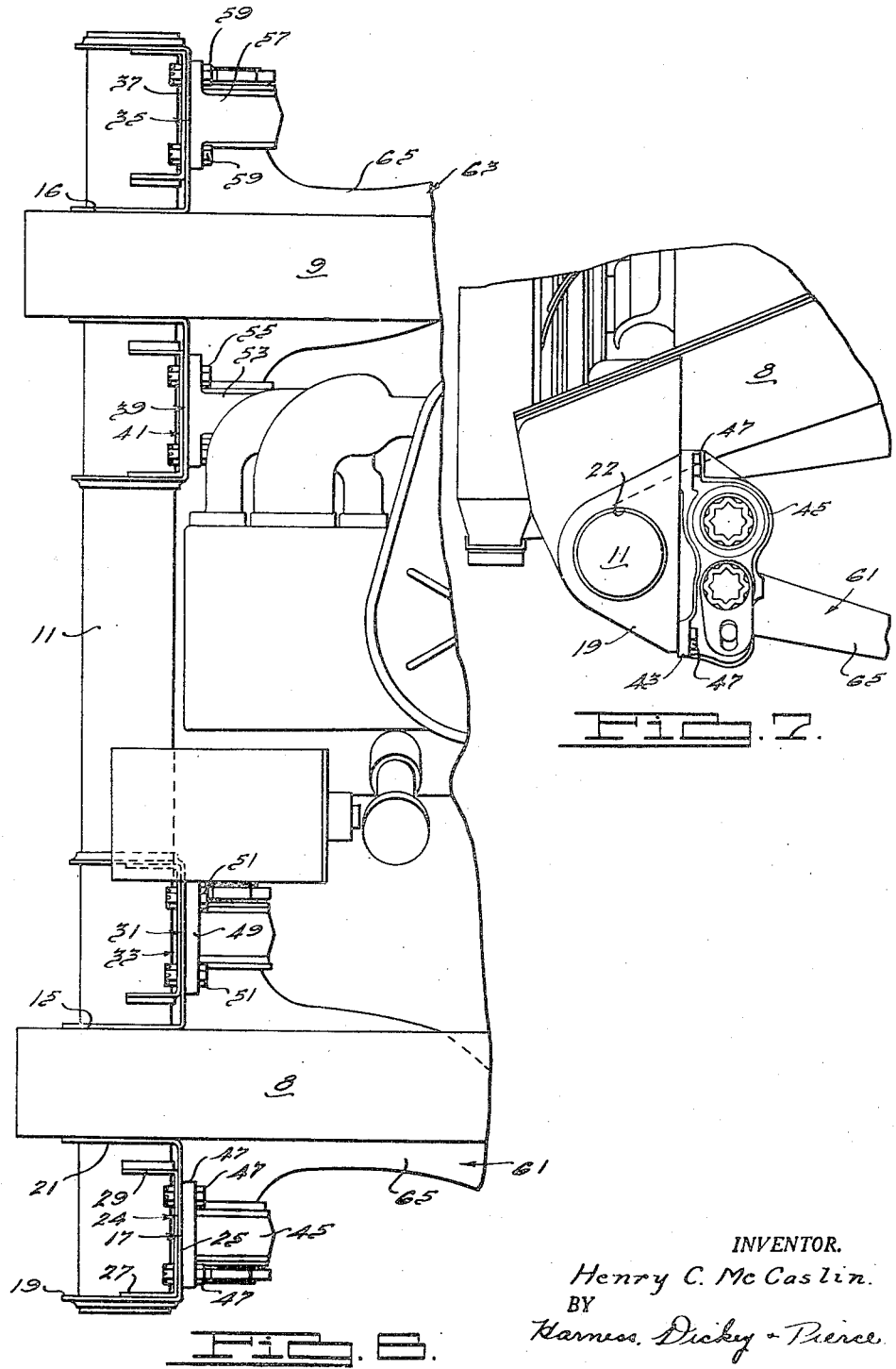
INVENTOR.
Henry C. McCaslin.
BY
Harness, Dickey & Pierce
ATTORNEYS Patented Dec. 28, 1948

2,457,583

UNITED STATES PATENT OFFICE 2,457,583

VEHICLE TORSION BAR INDIVIDUAL WHEEL SUSPENSION

Henry C. McCaslin, Dexter, Mich., assignor, by mesne assignments, to Kaiser-Frazer Corporation, Willow Run, Mich., a corporation of Nevada Application October 24, 1946, Serial No. 705,385

8 Claims. (Cl. 280—124)

This invention relates generally to the art of motor vehicles, and more particularly, to independent wheel suspensions therefor.

It is an object of this invention to provide an improved type of individual wheel suspension for a vehicle having a torsion bar.

It is a further object of this invention to provide in a torsion bar type independent wheel suspension a new type wheel mounting member.

It is a further object of this invention to provide an improved individual wheel suspension having a torsion bar and improved means for adjusting the torsion bar so as to vary the spring value on said bar.

It is a still further object of this invention to provide an improved suspension having a torsion bar for each wheel wherein the bars are so arranged and mounted as to simplify manufacture and assembly.

It is a still further object of this invention to provide an improved type suspension wherein the torsion bars are disposed transversely of the vehicle.

It is a still further object of this invention to provide a new type vehicle frame construction for mounting independent wheel suspensions thereon.

These and other objects of this invention will become apparent from the following detailed description taken in conjunction with the following drawings in which:

Figure 1 is a perspective view of a vehicle frame with the suspension embodiment of this invention thereon;

Fig. 2 is a cross sectional view taken along the line 2—2 of Fig. 1;

Fig. 3 is a horizontal cross section taken along the line 3—3 of Fig. 1;

Fig. 4 is a cross sectional view taken along the line 4—4 of Fig. 3;

Fig. 5 is an end elevational view showing the connection on one side of the vehicle of the torsion bars to the frame;

Fig. 6 is a partial plan view of the front end of the vehicle frame;

Fig. 7 is an elevational view of the structure illustrated in Fig. 6;

Fig. 8 is a cross sectional view taken along the line 8—8 of Fig. 2; and

Fig. 9 is a side elevation view of the bushing which is connected to the fixed end of each torsion bar.

Referring now to the drawings, and more particularly to Figures 1 and 6, it will be seen that the vehicle frame, generally indicated at 7, includes a pair of transversely spaced longitudinally extending beams 8 and 9. Adjacent both the front and the rear ends of the longitudinal beams 8 and 9 are a pair of transverse tubular members 11 and 13 respectively. For the purposes of this invention the construction of the front and rear ends of the vehicle frame, and suspension system therefor may be considered identical, and any exceptions or differences between the two will be brought out. For purposes of simplicity therefore, the construction and arrangement of parts for the front end only will be described, and unless otherwise stated, the construction of the rear end can be assumed to be identical.

The tubular transverse member 11 passes through an aperture 15 in the longitudinal beam 8 and an aperture 16 in the longitudinal beam 9, and is rigidly secured to both the beams 8 and 9 such as by welding. It will be noted that the outer end of the tubular member 11 extends outwardly beyond both the longitudinal beams 8 and 9. A generally U-shaped mounting member 17, having forwardly extending legs 19 and 21 which are provided with apertures 22 therein receiving the tubular member 11, is positioned on the outer end of the tubular member 11 adjacent the longitudinal beam 8. The legs 19 and 21 are welded to the tubular member 11, and the inner leg 21 is also welded to the longitudinal beam 8. In this way the mounting member 17 is rigidly secured to both the tubular member and to the longitudinal beam. A reinforcing U-shaped member 24 is fitted between the vertical plate or base 25 of the mounting member 17 and the tubular member 11. The member 24 likewise is generally U-shaped and its outer forwardly extending leg 27 is welded to the inside edge of the leg 19 of the mounting member 18. The opposite forwardly extending leg 29 is positioned inwardly of the leg 21 of the bracket 18 and is welded to the tubular member 11 and extends only around a portion of its outer periphery.

Adjacent the inner edge of the longitudinal beam 8 and similarly secured thereto and to the tubular member 11 is a second U-shaped mounting member 31 which likewise has a reinforcing member 33 connected thereto. These members are identical to the members 17 and 24 previously described for the opposite side of the longitudinal beam 8.

On the opposite side of the vehicle frame and adjacent the inner and outer edges of the longitudinal beam 9, similar mounting members and reinforcing members are provided. At the outer side of the longitudinal beam the mounting member is indicated at 35 and is provided with a reinforcing member 37, and adjacent the inner edge of the beam the mounting member and reinforcing member are indicated at 39 and 41.

A generally I-shaped bracket 43 having an integral vertical flange 45 thereon is secured to the vertical face of the mounting member 18 by means of four bolts 47. A similarly shaped bracket 49 is likewise connected to the mounting member 31 by means of bolts 51. On the opposite side of the vehicle frame, a similarly shaped bracket 53 is secured to the mounting member 39 by means of bolts 55 and outwardly of the longitudinal beam 9 a fourth similarly shaped bracket 57 is secured to the mounting member 35 by means of bolts 59.

On one side of the vehicle frame 7 adjacent the beam 8 and secured to the brackets 45 and 49 by means which will be hereinafter described, is a hollow wheel mounting member generally indicated at 61. On the opposite side of the vehicle frame adjacent the beam 9 and connected to the brackets 53 and 57 by means which will be hereinafter described, is a similar wheel mounting member 63. These two wheel mounting members 61 and 63 are identically constructed and therefore a description of one will suffice for both. Each of the wheel mounting members 61 and 63 comprises a longitudinally extending arm 65 which is formed to extend transversely of the frame at the rear end thereof to a wheel supporting knuckle 67 on the outer end thereof for mounting the vehicle wheel (not shown). Intermediate the ends of the arm 65 an aperture 69 is provided to allow the wheel axle (not shown) to pass therethrough to drive the wheels. In the embodiment shown in the drawings, the frame is designed for a front wheel drive vehicle, but it will readily be apparent that this invention may be used on a vehicle employing either front or rear wheel drive. The opposite end of the longitudinal arm 65 has a transverse hollow housing portion 71 extending transversely on opposite sides of the arm 65.

The construction of the wheel mounting members for the front and for the rear are slightly different. This difference is that for the rear wheels the outer end of the longitudinal arm 65 is formed to extend transversely of the frame as at 73 and has a threaded spindle 75 and wheel mounting plate 77 on the end thereof. This results from the fact that the rear wheels are not the driving wheels and are not steerable so no knuckle 67, as on the front wheels, is necessary and no aperture is necessary for an axle to pass therethrough. The connection at the forward end of the rear longitudinal arms is identical with the front wheel mounting member and the same hollow housing portion 71 is provided thereon. Each of the wheel mounting members comprise two half shells and these are welded so as to form the hollow structure.

In order to provide a spring action between the vehicle frame 7 and the wheel mounting member 61 a transversely extending torsion bar 79 is provided, which has one end thereof splined as at 81 and supported in the outer end of the hollow housing portion 71 of the mounting member 61 as illustrated in Fig. 2. The opposite end of the torsion bar is fixedly supported in the bracket 57 as will be hereinafter described. A second torsion arm 83 has one end thereof splined as at 85 and supported in the outer end of the hollow housing 71a of the wheel mounting member 63 and the opposite end thereof is fixedly secured to the bracket 45 as will be hereinafter described. The outer end of the hollow housing portion 71 of the wheel mounting member 61 is reduced in diameter and the wall is corrugated as at 87, as illustrated in Fig. 5, to mesh with the splines 81 on the end of the torsion bar 79 so as to provide a driving connection therebetween. The outer end of the housing portion 71a of the wheel mounting member 63 is similarly corrugated to cooperate with the splines 85 on the end of the torsion bar 83.

The bracket flange 45, as shown by Figs. 4 and 5, is provided with a pair of horizontal, vertically spaced apertures 89 and 91. The outer end of the hollow housing portion 71 of the wheel mounting member 61 is positioned within the aperture 89, and is journaled in an annular sleeve 95. The inner end of the sleeve 95 is provided with a vertical flange 97, as shown in Fig. 2, which acts as a stop for a rubber bushing means 99 which fits snugly between the outer wall of the sleeve 95 and the inner wall of the aperture 89 in the bracket. The outer end of the sleeve 95 is provided with two opposed horizontal flats 98 for a use which will be hereinafter described. The rubber bushing is held in place at its outer end by a spacer ring 100 which is held in abutting relation therewith by a washer 101 and a lock nut 102 which is threaded on the end of the sleeve 95. The spacer ring 100 has a pair of opposed projections 103 and the washer has a similar pair of projections which fit the sleeve flats 98 to prevent rotation of the spacer ring and washer when the nut 102 is tightened thereagainst. In this way the rubber bushing 99 is not wound on the sleeve when the nut is threaded thereon. The washer 101 likewise has a vertical tab 104 on the outer periphery thereof which can be bent over the nut 102 to lock the nut to the washer.

The second aperture 91 in the bracket flange 45 is adapted to receive the opposite end of the other torsion bar 83. This end of the torsion bar 83 is splined as at 105 and a bushing 107 is inserted in the aperture and surroundingly engages the end of the torsion bar. The bushing is corrugated on its inner periphery as at 109 so as to be drivingly connected to the splines 105 on the end of the torsion bar 83. The bushing 107 has a laterally extending flange 111, as shown best by Fig. 9, which when the bushing is inserted in the aperture 91 abuts against the outer face of the bracket flange 45. An elongated aperture 113 is provided adjacent the lower end of the flange 111 for use which will be hereinafter brought out. Below the aperture 91 in the bracket flange 45, the flange has a threaded recess 115 extending inwardly from the outer face thereof and an aperture 117 of a smaller diameter which communicates with the inner end of the recess 115 and passes inwardly through the remainder of the wall of the bracket flange. An adjusting member generally indicated at 121 has a threaded cylindrical portion 123 in threaded engagement with the inner periphery of the threaded recess 115. The adjusting member 121 has a reduced neck portion 125 which extends inwardly of the cylindrical portion 123 and which projects through and is journaled in the aperture 117 in the wall of the bracket flange 45. The outer end of this reduced neck portion 125 is threaded to receive a lock nut 127. Outwardly of the lock nut 127, the reduced neck 125 is formed with a rectangularly shaped end 129 to receive a wrench for actuating the adjusting member. Projecting outwardly from the outer end of the cylindrical portion 123 into the aperture 113 in the bushing flange 111 is a pin 131' which is located on the adjusting member 121 eccentric to the longitudinal axis thereof. Thus, it will be seen that by loosening the lock nut 129 on the reduced neck 125 of the adjusting member 121 and by applying a wrench to the rectangular end projecting outwardly beyond the lock nut, the adjusting member can be rotated within the threaded recess 115. When this is done, the eccentric pin 131 which projects into the elongated aperture 113 in the bushing flange will rotate and will cause the bushing 107 to be rotated in the aperture 91 of the bracket flange 45. This rotation of the bushing 107 will likewise cause rotation of the splined end 105 of the torsion bar 83, and thus will allow adjustment of the spring value of the torsion bar 83. After this adjustment has been obtained, and set, the lock nut 129 can be jammed against the end of the inner face of the bracket flange 45 and due to the threads on the cylindrical portion 123 will lock the adjusting member against rotation and fixedly position the splined end 105 of the torsion bar 83 in the bracket flange 45.

In order to prevent axial movement of the torsion bar the splined end 105 of the torsion bar has an annular groove 131 therein adjacent the outer end thereof. The wall of the bushing 107 has a slotted aperture 133 therethrough which is aligned with the annular groove 131 in the torsion bar. The bracket flange 45 has a threaded aperture 135 therein which is aligned with the groove in the torsion bar and the slotted aperture in the bushing. A screw 137 is threaded into the aperture 135 and passes through the slotted aperture 133 in the bushing and is seated in the annular groove 131 in the torsion bar. In this way the torsion bar cannot be axially moved but due to the slotted aperture 133 in the bushing, the bushing can still be rotated by the adjusting member 121 when it is desired to change the spring value of the torsion bar.

The opposite end of the torsion bar 83, from the adjustably fixed end, is connected to the bracket 57 in the same manner as is the splined end 81 of the torsion bar 79. That is, the hollow housing portion 71a of the wheel mounting member 63 is rotatably connected to the bracket 57 in the same manner as was the end of the hollow housing portion 71 of the wheel mounting member 61. The opposite end of the torsion bar 79 from the rotatively mounted splined end 81 is connected to the bracket 57 in a similar manner as was the splined end 105 of the torsion bar 83. That is, it is adjustably fixed in the bracket 57.

The inner end of the hollow housing portion 71 of the wheel mounting member 61 is mounted rotatably in the bracket 49 in a similar manner to the mounting of the outer end of the housing 71 in the bracket 45. However the torsion bar 79 passes freely through the hollow housing portion at its inner end. That is, a sleeve 138 corresponding to the sleeve 95 on the outer end of the housing 71 surrounds and acts as a journal for the end of the housing 71. A rubber bushing 139 similar to the rubber bushing 99 on the outer end is positioned in an aperture 140 in the flange of the bracket 57 similar to the aperture 89 in the bracket flange 45. The rubber bushing 139 is held in place at its outer end by a vertical flange 141 on the sleeve 138 and at its inner end by a spacer ring 143, a washer 145, and a lock nut 147 all similar to corresponding parts at the opposite or outer end on the bracket flange 45. The inner end of the hollow housing portion 71a of the wheel mounting member 63 is mounted in the flange of the bracket 53 in a manner identical with the inner end of the opposite hollow housing portion in the bracket 49.

It will thus be seen, that each torsion bar is rotatably mounted at the end which engages the wheel mounting member so as to allow rotation of the wheel mounting member at that end, while at the other end, the torsion bar is fixedly connected to a bracket on the opposite side of the frame and adjustable therein.

I claim:

1. In a wheel suspension for a vehicle, a frame including longitudinal beams on opposite sides thereof, a transverse tubular member secured to and extending outwardly beyond said longitudinal beams, spaced bracket mounting means secured to said tubular member and said frame beams, brackets rigidly connected to each of said bracket-mounting means, a pair of transversely disposed wheel mounting members rotatably connected to said brackets, and a torsion bar for each of said wheel mounting members fixedly connected at one end to one of said wheel mounting members and at the opposite end thereof to one of said brackets which carries the other of said wheel mounting members.

2. In a wheel suspension for a vehicle, a torsion bar, means mounting one end of said torsion bar to permit free rotation thereof about its longitudinal axis as to said end, an apertured stationary bracket in spaced relation to said torsion bar end, the opposite end of said torsion bar being positioned in said bracket aperture, a bushing rotatably mounted in said aperture and connected to said torsion bar end, a flange projecting laterally from said bushing and having an elongated aperture therethrough, a torsion bar adjusting member threadably mounted in said bracket adjacent said torsion bar aperture, a pin eccentric to the longitudinal axis of said adjusting member projecting outwardly therefrom into said bushing flange aperture, means on the opposite end of said adjusting member for turning the same, and means for locking said adjusting member against rotation to fixedly mount said torsion bar end to said bracket in an adjustable position.

3. In a wheel suspension for a vehicle, a torsion bar, means mounting one end of said bar to permit free rotation thereof about its longitudinal axis at said end, an apertured stationary bracket spaced from said torsion bar end, the opposite end of said torsion bar being positioned in said aperture, a bushing rotatably mounted in said aperture and connectedly supporting said torsion bar end, a laterally projecting flange on said bushing, a torsion bar adjusting member rotatably mounted in said bracket adjacent said torsion bar end, cam means on one end of said adjusting member projecting outwardly therefrom and connected to said bushing flange, means on the opposite end of said adjusting member for actuating the same, means locking said adjusting member to said bracket in an adjusted position, said bracket having a threaded aperture therein communicating with and normal to said torsion bar aperture, said bushing having a slotted aperture therein aligned with said bracket threaded aperture, said torsion bar end having an annular groove therein aligned with said bracket threaded aperture and said bushing slotted aperture, and means threaded in said threaded aperture and engaging said torsion bar groove to prevent axial movement of said torsion bar.

4. An apertured bracket for use in a torsion bar type wheel suspension for a vehicle, including a bushing adapted to rotatably fit in an aperture in said bracket, a laterally extending flange on said bushing having an elongated aperture therein, means formed on the inner periphery of said bushing adapted to engage the end of a torsion bar, an adjusting member rotatably mounted in said bracket, a pin projecting outwardly from said member into said bushing flange aperture, said pin being located eccentric to the axis of said adjusting member, means on the opposite end of said adjusting member for actuating the same, and means on said adjusting member for locking the same against rotation to fixedly mount said bushing in said bracket aperture.

5. Means for suspending a pair of wheels, comprising a first pair of spaced brackets and a second pair of spaced brackets in spaced relation to said first pair of brackets, first and second wheel mounting members, means formed in each of said brackets for rotatably supporting said wheel mounting members, first and second torsion bars, means formed in said first mounting member engagingly supporting one end of said first torsion bar, means formed in said second mounting member for engagingly supporting one end of said second torsion bar, the outermost of said first pair of brackets being so constructed as to fixedly mount the opposite end of said second bar and the outermost bracket of said second pair of brackets being so constructed as to fixedly mount the opposite end of said first bar, cam means mounted in each of said outermost brackets for adjustably fixing the rotative position of said first and second bars about their axes, respectively, to adjustably set the spring value of said bars at their respective opposite ends and means mounted in each of said outermost brackets to prevent axial movement of said torsion bars in relation to said brackets.

6. Means for suspending a pair of wheels comprising a first pair of spaced brackets and a second pair of spaced brackets, first and second wheel mounting members, means formed in each of said brackets for rotatably supporting said wheel mounting members, means formed in said first mounting member engagingly supporting one end of said first torsion bar, means formed in said second mounting member for engagingly supporting one end of said second torsion bar, the outermost of said first pair of brackets having an aperture therein adapted to receive the opposite end of said second bar and the outermost of said second pair of brackets having an aperture therein adapted to receive the opposite end of said first bar, a bushing rotatably mounted in each of said apertures and connectedly supporting said respective torsion bar ends, a laterally projecting flange formed on each of said bushings, a torsion bar adjusting member rotatably mounted in each of said brackets adjacent said torsion bar end, cam means on one end of said adjusting member projecting outwardly therefrom and connected to said bushing flange, means on the opposite end of said adjusting member for actuating the same, and means locking each of said adjusting members to their respective brackets in an adjusted position.

7. An apertured bracket for use in a torsion bar type wheel suspension for a vehicle, including a bushing adapted to rotatably fit in an aperture in said bracket, a laterally extending flange on said bracket having an elongated aperture therein, means formed on the inner periphery of said bushing adapted to engage the end of a torsion bar, an adjusting member rotatably mounted in said bracket, a pin projecting outwardly from said member into said bushing flange aperture, said pin being located eccentric to the axis of said adjusting member, means on the opposite end of said adjusting member for actuating the same, means on said adjusting member for locking the same against rotation to fixedly mount said bushing in said bracket aperture, said bracket having a threaded aperture therein communicating with said bushing aperture and extending normally therefrom, and means mounted in said threaded aperture engaging said torsion bar to prevent axial movement of the torsion bar with respect to said bracket.

8. Means for suspending a pair of wheels comprising a first pair of spaced brackets and a second pair of spaced brackets in spaced relation to said first pair of spaced brackets, first and second wheel mounting members, means formed in each of said brackets for rotatably supporting said wheel mounting members, means formed in said first mounting member engagingly supporting one end of said first torsion bar, means formed in said second mounting member for engagingly supporting one end of said second torsion bar, the outermost of said first pair of brackets having an aperture therein adapted to receive the opposite end of said second bar, and the outermost of said second pair of brackets having an aperture therein adapted to receive the opposite end of said first bar, a bushing rotatably mounted in each of said apertures and connectedly supporting said respective torsion bar ends, a laterally projecting flange formed on said bushing, a torsion bar adjusting member rotatably mounted in each of said brackets adjacent said torsion bar end, cam means on one end of said adjusting member projecting outwardly therefrom and connected to said bushing flange, means on the opposite end of said adjusting member for actuating the same, means locking each of said adjusting members to their respective brackets in an adjusted position, each of said brackets having a threaded aperture therein communicating with and normal to said torsion bar aperture, each of said bushings having a slotted aperture therein aligned with said threaded aperture, each of said torsion bar ends having an annular groove therein aligned with said bracket threaded aperture and said bushing slotted aperture, and means threaded in each of said threaded apertures and engaging each of said torsion bar apertures to prevent axial movement of each of said torsion bars.

HENRY C. McCASLIN.

REFERENCES CITED

The following references are of record in the file of this patent:

UNITED STATES PATENTS

| Number | Name | Date |
|---|---|---|
| 1,968,586 | Apple | July 31, 193. |
| 2,033,493 | Straussler | Mar. 10, 193. |
| 2,069,399 | White | Feb. 2, 193. |
| 2,103,590 | Lefevre | Dec. 28, 193. |
| 2,226,047 | Borgward | Dec. 24, 1940 |
| 2,254,261 | Best | Sept. 2, 1941 |
| 2,344,983 | Fageol | Mar. 28, 1944 |